(12) United States Patent
Cao et al.

(10) Patent No.: US 11,950,720 B2
(45) Date of Patent: Apr. 9, 2024

(54) DETACHABLE CARPET

(71) Applicant: KUNSHAN YIJIA JU TEXTILE CO., LTD., Kunshan (CN)

(72) Inventors: Shunlin Cao, Kunshan (CN); Yi Zhang, Kunshan (CN)

(73) Assignee: KUNSHAN YIJIA JU TEXTILE CO., LTD., Kunshan (CN)

( * ) Notice: Subject to any disclaimer, the term of this patent is extended or adjusted under 35 U.S.C. 154(b) by 495 days.

(21) Appl. No.: 17/260,537

(22) PCT Filed: Dec. 25, 2019

(86) PCT No.: PCT/CN2019/128289
§ 371 (c)(1),
(2) Date: Jan. 14, 2021

(87) PCT Pub. No.: WO2021/031491
PCT Pub. Date: Feb. 25, 2021

(65) Prior Publication Data
US 2021/0393064 A1    Dec. 23, 2021

(30) Foreign Application Priority Data
Aug. 16, 2019   (CN) .......................... 201910759370.6

(51) Int. Cl.
*A47G 27/02* (2006.01)
*A47G 27/04* (2006.01)
(Continued)

(52) U.S. Cl.
CPC ....... *A47G 27/025* (2013.01); *A47G 27/0225* (2013.01); *A47G 27/0281* (2013.01);
(Continued)

(58) Field of Classification Search
CPC ..... Y10T 428/23907; Y10T 428/23914; Y10T 428/23943; Y10T 428/2395;
(Continued)

(56) References Cited

U.S. PATENT DOCUMENTS

| 2013/0269395 A1* | 10/2013 | Yang ...................... D04B 21/02 66/196 |
| 2015/0064388 A1* | 3/2015 | Beyda ................ A47G 27/0412 428/74 |
| 2019/0211237 A1* | 7/2019 | Kawazoe ............... C09J 133/00 |

FOREIGN PATENT DOCUMENTS

| CN | 202671795 U | 1/2013 |
| CN | 203360764 U | 12/2013 |

(Continued)

OTHER PUBLICATIONS

Machine translation (Espacenet) of CZ 305702 B6. Translated Apr. 21, 2023. (Year: 2023).*

(Continued)

*Primary Examiner* — Maria V Ewald
*Assistant Examiner* — Ethan A. Utt
(74) *Attorney, Agent, or Firm* — Bayramoglu Law Offices LLC

(57) ABSTRACT

A detachable carpet includes a carpet surface and an anti-slip mat. The carpet surface includes a surface layer and a bottom three-dimensional mesh fabric structure layer. The anti-slip mat includes a bottom anti-slip and water-repellent layer and an upper bonding layer, and the bonding layer is a single-sided fabric on which are arranged a plurality of polyester, polypropylene or nylon monofilament protrusions. The protrusions can be inserted into corresponding meshes of the three-dimensional mesh fabric structure layer. The bonding layer of the anti-slip mat of the present invention adopts a single-sided structure layer formed by cutting the middle of the three-dimensional mesh fabric structure layer, or a
(Continued)

single-sided fabric that is made of at least 20 D monofilament and provided with protrusions. The 20 D-120 D polyester, polypropylene or nylon monofilament on the bonding layer forms thick and rigid protrusions with a certain stiffness.

7 Claims, 2 Drawing Sheets

(51) Int. Cl.
*D04B 21/04* (2006.01)
*D04B 21/20* (2006.01)

(52) U.S. Cl.
CPC .......... *A47G 27/0412* (2013.01); *D04B 21/04* (2013.01); *D04B 21/20* (2013.01)

(58) Field of Classification Search
CPC ..... Y10T 428/23979; Y10T 428/23986; Y10T 428/23993; Y10T 428/24008; Y10T 428/24017; Y10T 428/24273; Y10T 428/24322; Y10T 428/24331; B32B 3/00; B32B 3/24; B32B 3/26; B32B 3/266; B32B 3/30; B32B 5/00; B32B 5/02; B32B 5/026; B32B 5/06; B32B 5/073; B32B 5/22; B32B 7/24; B32B 5/26; B32B 7/00; B32B 7/04; B32B 7/06; B32B 7/08; B32B 2471/00; B32B 2471/02; B32B 2471/04; A47G 27/00; A47G 27/02; A47G 27/0206; A47G 27/0212; A47G 27/0225
USPC ...... 428/85, 86, 90, 91, 95, 96, 97, 99, 100, 428/131, 137, 138
See application file for complete search history.

(56) References Cited

FOREIGN PATENT DOCUMENTS

| | | | | |
|---|---|---|---|---|
| CN | 205125846 U | 4/2016 | | |
| CN | 206390836 U | 8/2017 | | |
| CN | 206414124 U | 8/2017 | | |
| CN | 108244967 A | 7/2018 | | |
| CN | 110393413 A | 11/2019 | | |
| CZ | 305702 B6 * | 2/2016 | | |
| EP | 3276061 A1 * | 1/2018 | ........... | B29C 70/224 |
| JP | 2008183167 A * | 8/2008 | | |
| WO | 9838376 A1 | 9/1998 | | |
| WO | WO-2018117205 A1 * | 6/2018 | .............. | C09J 11/06 |

OTHER PUBLICATIONS

Machine translation (Espacenet) of EP 3,276,061 A1. Translated Apr. 22, 2023. (Year: 2023).*

Machine translation (Espacenet) of JP 2008-183167 A. Translated Apr. 22, 2023. (Year: 2023).*

* cited by examiner

DETACHABLE CARPET

CROSS REFERENCE TO THE RELATED APPLICATIONS

This application is the national phase entry of International Application No. PCT/CN2019/128289, filed on Dec. 25, 2019, which is based upon and claims priority to Chinese Patent Application No. 201910759370.6, filed on Aug. 16, 2019, the entire contents of which are incorporated herein by reference.

TECHNICAL FIELD

The present invention relates to a carpet in the textile industry, and more particularly, to a detachable carpet.

BACKGROUND

Standard bath mats and carpets are typically designed by the following two methods. One method is to design towel-like bath mats such that they are washable, but this kind of mat is not anti-slip and thus has potential safety hazards. The other method is to bond an anti-slip material to the back of a carpet. This carpet is considered washable, but once washed in a machine, it will be separated or damaged, or the upper fabric and the lower backing separated. Moreover, the cumbersome design and manufacture as well as the substantial cost of traditional carpets hinder their versatility. For example, such carpets cannot be changed seasonally as needed. Therefore, it is highly desirable to develop a carpet that not only has the functions of a conventional carpet, but also allows users to separate the surface material of the carpet from the backing layer with anti-slip and water-repellent properties, thereby removing and washing the surface material of the carpet.

In the prior art, a composite carpet uses a hook-and-loop fastener to connect the carpet surface and the backing of the carpet. The two layers are connected together by two sides of the hook-and-loop fastener. One side of the hook-and-loop fastener is composed of tiny and soft fiber loops, and the other side of the hook-and-loop fastener is composed of rigid hooks. The loop side and the hook side bind when pressed together, and can be pulled apart only under a relatively large force. In this regard, when using the hook-and-loop fastener to connect the carpet surface and the backing of a soft carpet, the relatively large force is likely to cause damage to the carpet and also is inconvenient to disassemble. Also, the rigid side of the hook-and-loop fastener will reduce the comfort of the carpet. Additionally, the hook-and-loop fastener or the granular backing has a deleterious effect on and usually destroys the soft loop pile fabric, and after repeated use, the connection force is significantly reduced.

In the prior art, CN 201520843605.7 discloses a detachable anti-slip carpet where the top surface of the base layer is provided with a plurality of shrinkable meshes that are uniformly distributed. The bottom surface of the connecting layer is provided with protrusions that correspond one-to-one with the meshes. The woolen layer is knitted and fixed on the top surface of the connecting layer. However, this carpet is complicated to manufacture, and the connection between the top surface of the base layer and the bottom surface of the connecting layer is inelastic. In use, the carpet produces echoes, which adds ambient noise, and cuts against sound insulation. The protrusions are also easily damaged during disassembly and cleaning, and are often deformed due to temperature fluctuations, which seriously affects connectivity and service life of the carpet. Furthermore, the protrusions and meshes of the patented floor covering must be completely aligned when engaged. This makes it difficult to install and requires professional assistance, which adds cost.

CN 201711361727.2 discloses another detachable carpet. The carpet includes a base fabric layer, and left and right sides of each of the top and the bottom of the base fabric layer are provided with clamping strips. The connection between each of the two waterproof layers and the base fabric layer is provided with fixing grooves matched with the clamping strips. The waterproof layer and the base fabric layer can be assembled and disassembled by engagement of the clamping strips and the fixing grooves. The waterproof layer and the base fabric layer are connected by engaging the clamping strips with the fixing grooves provided on the left and right sides of the waterproof layer. The connection between the waterproof layer and the base fabric layer, however, is characterized by an external mechanical connection that is not integral with the carpet. The clamping strip has seams, and the carpet is relatively rigid, which is suitable for laying on a large area. Therefore, this carpet is generally suitable for institutional use, for example in hotels and offices, rather than domestic use.

SUMMARY

To overcome the shortcomings of the above-mentioned existing detachable and washable composite carpets, for example, high bonding force during use easily leads to damage to the carpet surface during disassembly, low bonding force affects use, and prior carpets are inconvenient to disassemble, difficult to service and have a shortened service life, it is an objective of the present invention to provide a detachable carpet.

The objective of the present invention is achieved by adopting the following technical solutions.

The present invention provides a detachable carpet, including a carpet surface and an anti-slip mat.

The carpet surface includes a surface layer and a bottom three-dimensional mesh fabric structure layer.

The anti-slip mat includes a bottom anti-slip and water-repellent layer and an upper bonding layer. The bonding layer is a single-sided fabric on which are arranged a plurality of polyester, polypropylene or nylon monofilament protrusions.

The polyester, polypropylene or nylon monofilament protrusions can be inserted into the meshes of the three-dimensional mesh fabric structure layer.

As an embodiment of the present invention, the included angle between the polyester, polypropylene or nylon monofilament protrusion and the single-sided fabric is 40°-90°.

In one embodiment, the bonding layer is a single-sided structure layer formed by cutting the middle of a three-dimensional mesh fabric structure layer. The three-dimensional mesh fabric structure layer includes an upper warp-knitted mesh fabric layer, a lower warp-knitted mesh fabric layer, and a plurality of polyester, polypropylene or nylon monofilaments that are arranged vertically in the middle to connect the upper warp-knitted mesh fabric layer and the lower warp-knitted mesh fabric layer.

The area of a single mesh on a single-sided warp-knitted mesh fabric of the single-sided structure layer ranges from 0.2 square millimeters to 100 square millimeters.

The three-dimensional mesh fabric structure layer is integrally knitted by using 20 D-120 D (20 denier-120 denier)

polyester, polypropylene or nylon monofilaments. More specifically, the three-dimensional mesh fabric structure layer is integrally knitted by using 20 D-120 D polyester monofilament yarn. When the polyester monofilament is lower than 20 D, the polyester monofilament protrusions formed on the bonding layer are excessively soft, and thus cannot be inserted into or can only be partially inserted into the meshes of the bottom three-dimensional mesh fabric structure layer of the carpet surface. A polyester monofilament lower than 20 D cannot achieve the high bonding strength advantages that are characteristic of the present invention.

In an embodiment of the present invention, the bonding layer is a single-sided tufted fabric knitted by using 20 D-120 D polyester, polypropylene or nylon monofilaments, or is a single-sided flocked fabric knitted by using 20 D-120 D polyester, polypropylene or nylon monofilaments.

In the present invention, the height of the polyester, polypropylene or nylon monofilament protrusion on the bonding layer is 1.5 mm-10 mm.

As an embodiment of the present invention, the bottom three-dimensional mesh fabric structure layer of the carpet surface includes an upper warp-knitted mesh fabric layer, a lower warp-knitted mesh fabric layer, and a plurality of polyester, polypropylene or nylon monofilaments that are arranged vertically in the middle to connect the upper warp-knitted mesh fabric layer and the lower warp-knitted mesh fabric layer. The included angle between the polyester, polypropylene or nylon monofilament and the upper warp-knitted mesh fabric layer or the lower warp-knitted mesh fabric layer is 40°-90°.

The thickness of the three-dimensional mesh fabric structure layer is 2 mm-20 mm. The area of a single mesh on the upper warp-knitted mesh fabric layer or the lower warp-knitted mesh fabric layer ranges from 0.2 square millimeters to 100 square millimeters.

In an embodiment, the bottom three-dimensional mesh fabric structure layer of the carpet surface is also integrally knitted by using 20 D-120 D polyester monofilament yarn.

As an embodiment of the present invention, the surface layer is a combination of at least one selected from the group consisting of a pile weave layer, a plain weave layer, and a loop pile layer.

As an embodiment of the present invention, the anti-slip and water-repellent layer is a foamed latex layer, a thermoplastic elastomer material layer, an acrylic resin layer, an ethylene-vinyl acetate (EVA) foam layer, a polyurethane foam layer, a cross-linked polyethylene (XPE) foam layer or an irradiated XPE (IXPE) foam layer.

In an embodiment of the present invention, a washable and movable double-sided adhesive tape made of polyurethane and acrylic through a nanotechnology is provided on the periphery or the four top corners of the three-dimensional mesh fabric structure layer of the carpet surface. The double-sided adhesive tape is configured to strengthen the bonding between the periphery of the carpet surface and the anti-slip mat.

Compared with the prior art, the present invention has the following advantages.

1. The bonding surface of the anti-slip mat of the present invention adopts a single-sided structure layer formed by cutting the middle of the three-dimensional mesh fabric structure layer. The polyester monofilament on the single-sided structure layer is integrally formed with the warp-knitted mesh fabric, and thus is not easy to disengage, thus improving the service life.

2. The 20 D-120 D polyester monofilament on the bonding surface (especially the single-sided structure layer formed by cutting the middle of the three-dimensional mesh fabric structure layer) of the anti-slip mat of the present invention can form thick and rigid protrusions with a certain stiffness, which is easily and freely inserted into the meshes of the bottom three-dimensional mesh fabric structure layer of the carpet surface. In this way, the carpet is convenient to disassemble repeatedly without damage.

3. The bottom layer of the carpet surface of the present invention adopts a three-dimensional mesh fabric structure layer, which is made of the same material as the bonding surface of the anti-slip mat. Since the three-dimensional mesh fabric structure layer has a certain thickness, when inserted into the mesh, the protrusion on the bonding surface is also inserted into the gap connecting the polyester monofilament in the middle of the three-dimensional mesh fabric structure layer. In this way, the carpet surface and the anti-slip mat have high bonding strength when used in combination and thus do not become dislodged during use, and the periphery of the carpet surface will not warp, which provides good comfort.

4. The carpet surface and the anti-slip mat both use the whole/half three-dimensional mesh fabric structure layer, are used in combination to endow the carpet of the present invention with good elasticity and also extend the service life of the carpet itself while providing users with comfort and protection.

5. The detachable carpet of the present invention can be rolled and folded and is convenient to transport.

BRIEF DESCRIPTION OF THE DRAWINGS

By reading the detailed description of the non-restrictive embodiments with reference to the drawings, other features, objectives and advantages of the present invention will become more apparent.

In the figures, 1—pile weave structure surface layer, 2—adhesive layer, 3—warp-knitted three-dimensional mesh fabric, 4—bonding layer, 5—anti-slip and water-repellent layer, 6—plain weave structure surface layer, 7—loop pile structure surface layer.

DETAILED DESCRIPTION OF THE EMBODIMENTS

The present invention will be described in detail below with reference to the embodiments. The following embodiments will help those skilled in the art to further understand the present invention, but do not limit the present invention in any form. It should be pointed out that for those having ordinary skill in the art, several adjustments and improvements can be made without departing from the concept of the present invention. These adjustments and improvements all shall fall within the scope of protection of the present invention.

Embodiment 1

Figure 1A:
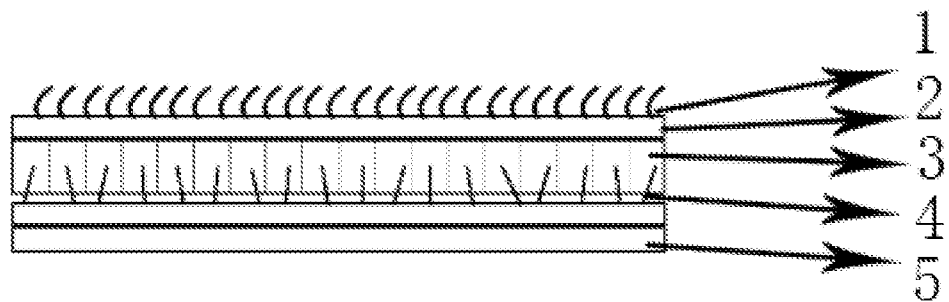
FIG. 1A is a schematic diagram of the structure of a detachable carpet with a pile weave structure surface layer.
Figure 2A:
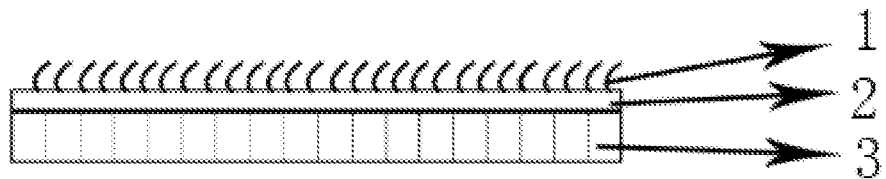
FIG. 2A is a schematic diagram of the structure of the carpet surface of a detachable carpet with a pile weave structure surface layer.
Figure 3:
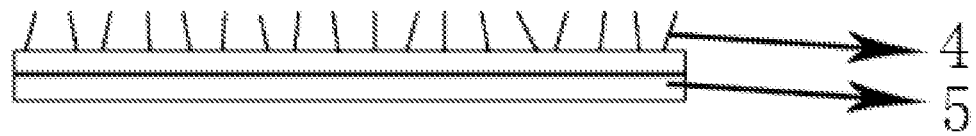
FIG. 3 is a schematic diagram of the structure of the anti-slip mat of the detachable carpet of the present invention.

As shown in FIG. 1A, FIG. 2A and FIG. 3, the present embodiment relates to a detachable carpet, including:
  a carpet surface, wherein the carpet surface includes the pile weave structure surface layer 1, the bottom warp-knitted three-dimensional mesh fabric 3, and the adhesive layer 2 arranged between the aforementioned two layers; and
  an anti-slip mat, wherein the anti-slip mat includes the bottom anti-slip and water-repellent layer 5 (foamed latex layer) and the upper bonding layer 4, and the bonding layer 4 is a single-sided warp-knitted mesh fabric on which a plurality of polyester monofilament protrusions are arranged.

The polyester monofilament protrusions on the anti-slip mat can be inserted into the meshes of the warp-knitted three-dimensional mesh fabric of the carpet surface, so that the carpet surface and the anti-slip mat are used in combination.

The bottom warp-knitted three-dimensional mesh fabric of the carpet surface includes an upper warp-knitted mesh fabric layer, a lower warp-knitted mesh fabric layer, and a plurality of polyester monofilaments that are arranged vertically in the middle to connect the upper warp-knitted mesh fabric layer and the lower warp-knitted mesh fabric layer. Specifically, the bottom warp-knitted three-dimensional mesh fabric is integrally knitted by using 60 D polyester monofilament yarn. The included angle between the polyester monofilament and the upper warp-knitted mesh fabric layer or the lower warp-knitted mesh fabric layer is 60°-90°. The thickness of the three-dimensional mesh fabric structure layer is 5 mm. The area of a single mesh on the upper warp-knitted mesh fabric layer or the lower warp-knitted mesh fabric layer is 20 square millimeters.

The bonding layer of the anti-slip mat is a single-sided structure layer formed by cutting the middle of the three-dimensional mesh fabric structure layer. The three-dimensional mesh fabric structure layer includes an upper warp-knitted mesh fabric layer, a lower warp-knitted mesh fabric layer, and a plurality of polyester monofilaments that are arranged vertically in the middle to connect the upper warp-knitted mesh fabric layer and the lower warp-knitted mesh fabric layer. Specifically, the three-dimensional mesh fabric structure layer is integrally knitted by using 80 D polyester monofilament bulked continuous filament (BCF) yarn. The included angle between the polyester monofilament protrusion and the warp-knitted mesh fabric is 40°-60°. The height of the polyester monofilament protrusion is 5 mm. A single mesh on the warp-knitted mesh fabric of the bonding layer has an area of 20 square millimeters and a size of 4 mm×5 mm.

Embodiment 2

Figure 1B:
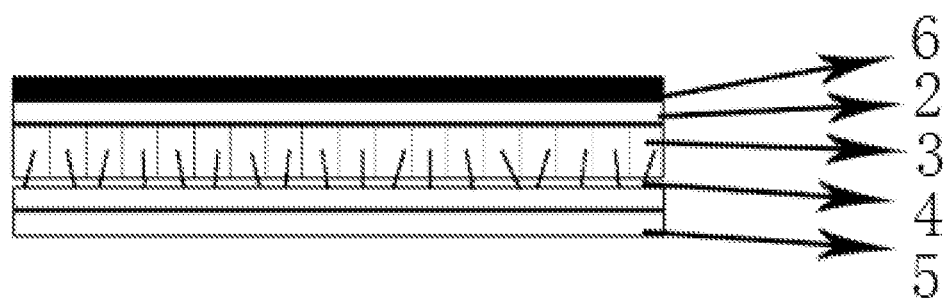
FIG. 1B is a schematic diagram of the structure of a detachable carpet with a plain weave structure surface layer.
Figure 2B:
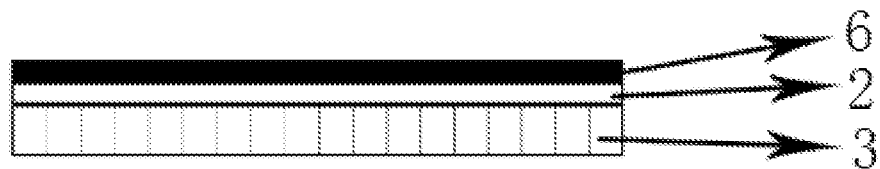
FIG. 2B is a schematic diagram of the structure of the carpet surface of a detachable carpet with a plain weave structure surface layer.

As shown in FIG. 1B, FIG. 2B and FIG. 3, the present embodiment relates to a detachable carpet, including:
  a carpet surface, wherein the carpet surface includes the plain weave structure surface layer 6, the bottom warp-knitted three-dimensional mesh fabric 3, and the adhesive layer 2 arranged between the aforementioned two layers; and
  an anti-slip mat, wherein the anti-slip mat includes the bottom anti-slip and water-repellent layer 5 (thermoplastic elastomer/thermoplastic rubber (TPE/TPR) material layer) and the upper bonding layer 4, and the bonding layer 4 is a single-sided warp-knitted mesh fabric on which a plurality of polyester monofilament protrusions are arranged.

The polyester monofilament protrusions on the anti-slip mat can be inserted into the meshes of the warp-knitted three-dimensional mesh fabric of the carpet surface, so that the carpet surface and the anti-slip mat are used in combination.

The bottom warp-knitted three-dimensional mesh fabric of the carpet surface includes an upper warp-knitted mesh fabric layer, a lower warp-knitted mesh fabric layer, and a plurality of polyester monofilaments that are arranged vertically in the middle to connect the upper warp-knitted mesh fabric layer and the lower warp-knitted mesh fabric layer. Specifically, the bottom warp-knitted three-dimensional mesh fabric is integrally knitted by using 20 D polyester monofilament yarn. The included angle between the polyester monofilament and the upper warp-knitted mesh fabric layer or the lower warp-knitted mesh fabric layer is 40°-70°. The thickness of the three-dimensional mesh fabric structure layer is 2 mm. The area of a single mesh on the upper warp-knitted mesh fabric layer or the lower warp-knitted mesh fabric layer is 0.2 square millimeters.

The bonding layer of the anti-slip mat is a single-sided structure layer formed by cutting the middle of the three-dimensional mesh fabric structure layer. The three-dimensional mesh fabric structure layer includes an upper warp-knitted mesh fabric layer, a lower warp-knitted mesh fabric layer, and a plurality of polyester monofilaments that are arranged vertically in the middle to connect the upper warp-knitted mesh fabric layer and the lower warp-knitted mesh fabric layer. Specifically, the three-dimensional mesh fabric structure layer is integrally knitted by using 20 D polyester monofilament BCF yarn. The included angle between the polyester monofilament protrusion and the warp-knitted mesh fabric is 50°-70°. The height of the polyester monofilament protrusion is 1.5 mm. The area of a single mesh on the warp-knitted mesh fabric of the bonding layer is 0.2 square millimeters.

Embodiment 3

Figure 1C:
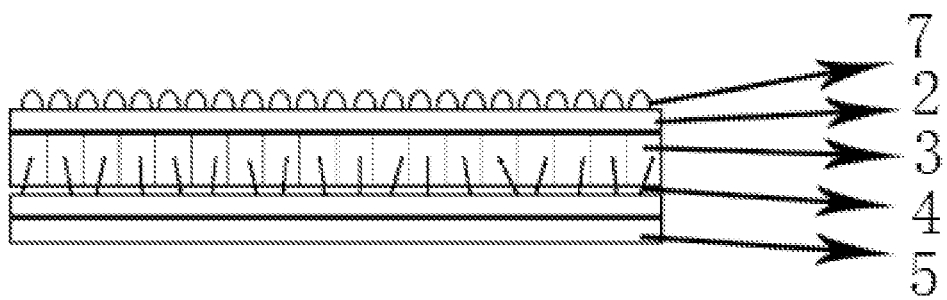
FIG. 1C is a schematic diagram of the structure of a detachable carpet with a loop pile structure surface layer.
Figure 2C:
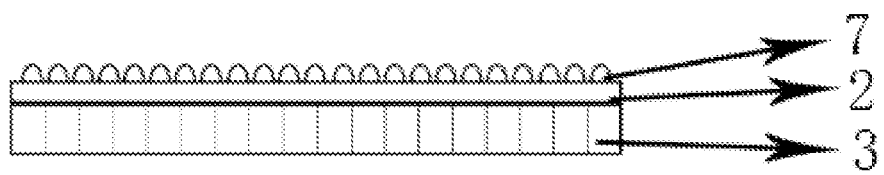
FIG. 2C is a schematic diagram of the structure of the carpet surface of a detachable carpet with a loop pile structure surface layer.

As shown in FIG. 1C, FIG. 2C and FIG. 3, the present embodiment relates to a detachable carpet, including:
  a carpet surface, wherein the carpet surface includes the loop pile structure surface layer 7, the bottom warp-knitted three-dimensional mesh fabric 3, and the adhesive layer 2 arranged between the aforementioned two layers; and
  an anti-slip mat, wherein the anti-slip mat includes the bottom anti-slip and water-repellent layer 5 (acrylic resin layer) and the upper bonding layer 4, and the bonding layer 4 is a single-sided warp-knitted mesh fabric on which a plurality of polyester monofilament protrusions are arranged.

The polyester monofilament protrusions on the anti-slip mat can be inserted into the meshes of the three-dimensional mesh fabric structure layer of the carpet surface, so that the carpet surface and the anti-slip mat are used in combination.

The bottom three-dimensional mesh fabric structure layer of the carpet surface includes an upper warp-knitted mesh fabric layer, a lower warp-knitted mesh fabric layer, and a plurality of polyester monofilaments that are arranged vertically in the middle to connect the upper warp-knitted mesh fabric layer and the lower warp-knitted mesh fabric layer. Specifically, the bottom three-dimensional mesh fabric structure layer is integrally knitted by using 120 D polyester monofilament yarn. The included angle between the polyester monofilament and the upper warp-knitted mesh fabric layer or the lower warp-knitted mesh fabric layer is 70°-90°. The thickness of the three-dimensional mesh fabric structure layer is 20 mm. The area of a single mesh on the upper warp-knitted mesh fabric layer or the lower warp-knitted mesh fabric layer is 64 square millimeters.

The bonding layer of the anti-slip mat is a single-sided structure layer formed by cutting the middle of the three-dimensional mesh fabric structure layer. The three-dimensional mesh fabric structure layer includes an upper warp-knitted mesh fabric layer, a lower warp-knitted mesh fabric layer, and a plurality of polyester monofilaments that are arranged vertically in the middle to connect the upper warp-knitted mesh fabric layer and the lower warp-knitted mesh fabric layer. Specifically, the three-dimensional mesh fabric structure layer is integrally knitted by using 120 D polyester monofilament BCF yarn. The included angle between the polyester monofilament protrusion and the warp-knitted mesh fabric is 40°-60°. The height of the polyester monofilament protrusion is 10 mm. The area of a single mesh on the warp-knitted mesh fabric of the bonding layer is 100 square millimeters.

Embodiment 4

The present embodiment relates to a detachable carpet, including:
a carpet surface, wherein the carpet surface includes a loop pile structure surface layer, a bottom warp-knitted three-dimensional mesh fabric, and an adhesive layer arranged between the aforementioned two layers; and
an anti-slip mat, wherein the anti-slip mat includes a bottom anti-slip and water-repellent layer (acrylic resin layer) and an upper bonding layer, and the bonding layer is a single-sided tufted fabric on which a plurality of polyester monofilament protrusions are arranged.

The polyester monofilament protrusions on the anti-slip mat can be inserted into the meshes of the three-dimensional mesh fabric structure layer of the carpet surface, so that the carpet surface and the anti-slip mat are used in combination.

The bottom three-dimensional mesh fabric structure layer of the carpet surface includes an upper warp-knitted mesh fabric layer, a lower warp-knitted mesh fabric layer, and a plurality of polyester monofilaments that are arranged vertically in the middle to connect the upper warp-knitted mesh fabric layer and the lower warp-knitted mesh fabric layer. Specifically, the bottom three-dimensional mesh fabric structure layer is integrally knitted by using 120 D polyester monofilament yarn. The included angle between the polyester monofilament and the upper warp-knitted mesh fabric layer or the lower warp-knitted mesh fabric layer is 70°-90°. The thickness of the three-dimensional mesh fabric structure layer is 8 mm. The area of a single mesh on the upper warp-knitted mesh fabric layer or the lower warp-knitted mesh fabric layer is 36 square millimeters.

The bonding layer of the anti-slip mat is integrally knitted and tufted by using 100 D polyester monofilament yarn. The included angle between the polyester monofilament protrusion and the single-sided tufted fabric is 50°-60°. The height of the polyester monofilament protrusion is 8 mm. The area of a single mesh on the warp-knitted mesh fabric of the bonding layer is 36 square millimeters.

Performance Verification

In the prior art, there is a carpet with a mat, and the carpet is constructed by attaching a cover to an anti-slip and water-repellent mat underneath by means of an interlocking mechanical connection between the loops on the cover and the hooks on the mat.

The interlocking mechanical connection in a first implementation manner is formed by a hook-and-loop structure, sold under the trademark VELCRO. This kind of VELCRO functions as a hook-and-loop fastener, but as well-known, the loops and hooks loose resiliency and become damaged after repeated use. For example, the pile surface is damaged after the loops and hooks are repeatedly disassembled 10 times, resulting in insufficient bonding strength.

The interlocking mechanical connection in a second implementation manner is formed by a granular material layer on the mat. The cover is made of pile fabric and has tiny loops on its top, which are not visible with the naked eye, and the granular material layer on the mat is formed by performing heat treatment on 3D-18 D short fibers on the mat to form a granular layer. Therefore, this interlocking connection has poor connection strength, and the periphery of the cover may warp during use, which affects the user experience. In addition, since the granular material layer on the mat is formed by performing heat treatment on the fibers on the mat to form the granular layer, it cannot be crimped or folded.

The interlocking mechanical connection in a third implementation manner is formed by a resin material having protrusions interlocked with the bottom surface of the cover. However, this interlocking mechanical connection between the cover and the mat has a poor bonding force.

Taking the second implementation manner as control group 1, and the first implementation manner as control group 2. The detachable carpets in control group 1, control group 2 and Embodiment 1 are subjected to the following tests:

1. Bonding Strength Test

Test Instrument: Computerized Desktop Tensile Testing Machine

1) The carpet surface and the mat each with a size of 5 cm×20 cm in control group 1 overlap each other, and are rolled twice with a 6 kg roller and subjected to three average peel force tests by the tensile testing machine to obtain the test results as follows: 0.576 Newton, 0.453 Newton and 0.321 Newton, indicating that the peel force thereof is gradually weakened.

The carpet surface and the mat each with a size of 5 cm×20 cm in control group 2 overlap each other, and are rolled twice with a 6 kg roller and subjected to three average peel force tests by the tensile testing machine to obtain the test results as follows: 1.881 Newton, 1.346 Newton and 1.219 Newton, indicating that the peel force thereof is also gradually weakened.

The carpet surface and the anti-slip bonding layer each with a size of 5 cm×20 cm taken from the detachable carpet in Embodiment 1 overlap each other, and are rolled twice with a 6 kg roller and subjected to three average peel force tests by the tensile testing machine to obtain the test results as follows: 1.387 Newton, 1.325 Newton and 1.467 Newton, indicating that the peel force thereof remains basically unchanged, and is significantly better than that in control group 1.

2) The carpet surface and the mat each with a size of 5 cm×20 cm in control group 1 overlap each other, and are rolled twice with a 6 kg roller and subjected to three average lateral separation force tests by the tensile testing machine to obtain the test results as follows: 26.551 Newton, 11.575 Newton and 6.230 Newton, indicating that the lateral separation force is sharply weakened.

The carpet surface and the mat each with a size of 5 cm×20 cm in control group 2 overlap each other, and are rolled twice with a 6 kg roller and subjected to three average lateral separation force tests by the tensile testing machine to obtain the test results as follows: 70.875 Newton, 35.529 Newton and 26.182 Newton, indicating that the lateral separation force is sharply weakened.

The carpet surface and the anti-slip bonding layer each with a size of 5 cm×20 cm taken from the detachable carpet in Embodiment 1 overlap each other, and are rolled twice with a 6 kg roller and subjected to three average lateral separation force tests by the tensile testing machine to obtain the test results as follows: 52.128 Newton, 52.128 Newton and 53.252 Newton, indicating that the lateral separation force remains basically unchanged, and is significantly better than that in control group 1.

2. Disassembly Life Test:

The carpet surface and the mat each with a size of 5 cm×20 cm in control group 1 overlap each other, and are rolled twice with a 6 kg roller and subjected to twenty longitudinal and lateral separation tests by the tensile testing machine. It is found that the loop pile of the bottom layer of the carpet surface is seriously damaged, and the granular layer is partially damaged. The broken granular particles stick to the pile fabric of the bottom layer of the carpet surface, which seriously affects the appearance, and the peel force cannot be tested by the tensile testing machine due to the final adhesion force.

The carpet surface and the mat each with a size of 5 cm×20 cm in control group 2 overlap each other, and are rolled twice with a 6 kg roller and subjected to twenty longitudinal and lateral separation tests by the tensile testing machine. It is found that the loop pile of the bottom layer of the carpet surface is seriously damaged, and the peel force cannot be tested by the tensile testing machine due to the final adhesion force.

The carpet surface and the anti-slip bonding layer each with a size of 5 cm×20 cm taken from the detachable carpet in Embodiment 1 overlap each other, and are rolled twice with a 6 kg roller and subjected to twenty longitudinal and lateral separation tests by the tensile testing machine to obtain the test result of the peel force: 1.335 Newton.

The specific embodiments of the present invention have been described above. It should be understood that the present invention is not limited to the above specific embodiments, and those skilled in the art can make various transformations or modifications within the scope of the claims, which does not affect the essence of the present invention.

What is claimed is:

1. A detachable carpet, comprising:

a carpet surface comprising a surface layer and a bottom three-dimensional mesh fabric structure layer, and an anti-slip mat comprising a bottom anti-slip and water-repellent layer and an upper bonding layer; wherein the upper bonding layer is a single-sided structure layer formed by cutting a middle of a three-dimensional mesh fabric structure layer and is integrally knitted by using 20 D-120 D polyester monofilament yarn, the three-dimensional mesh fabric structure layer comprising an upper warp-knitted mesh fabric layer, a lower warp-knitted mesh fabric layer, the thickness of the three-dimensional mesh fabric structure layer is 2 mm-20 mm, a plurality of polyester, polypropylene or nylon monofilament protrusions arranged vertically in the middle to connect the upper warp-knitted mesh fabric layer and the lower warp-knitted mesh fabric layer, and a height of each of the plurality of polyester, polypropylene or nylon monofilament protrusions on the upper bonding layer is 5 mm-10 mm;

the bottom three-dimensional mesh fabric structure layer of the carpet surface comprises an upper warp-knitted mesh fabric layer, a lower warp-knitted mesh fabric layer, and a plurality of polyester, polypropylene or nylon monofilaments, wherein the plurality of polyester, polypropylene or nylon monofilaments are arranged vertically in a middle of the bottom three-dimensional mesh fabric structure layer to connect the upper warp-knitted mesh fabric layer and the lower warp-knitted mesh fabric layer; and the plurality of polyester, polypropylene or nylon monofilament protrusions of the upper bonding layer are inserted into meshes of the bottom three-dimensional mesh fabric structure layer creating a bonding strength between the upper bonding layer and the bottom three-dimensional mesh fabric structure layer that has a peel force between 1.325 and 1.467 Newton after subjecting the detachable carpet with a size of 5 cm×20 cm to be rolled twice with a 6 kg roller; and wherein a washable and movable double-sided adhesive tape made of polyurethane and acrylic is provided on a periphery or four top corners of the bottom three-dimensional mesh fabric structure layer of the carpet surface.

2. The detachable carpet according to claim 1, wherein, an included angle between each of the plurality of polyester, polypropylene or nylon monofilament protrusions and the single-sided fabric is 40°-90°.

3. The detachable carpet according to claim 2, wherein, an area of a single mesh on a single-sided warp-knitted mesh fabric of the single-sided structure layer of the upper bonding layer ranges from 0.2 square millimeters to 100 square millimeters.

4. The detachable carpet according to claim 2, wherein, the upper bonding layer is a single-sided tufted fabric knitted by using 20 D-120 D polyester, polypropylene or nylon monofilaments, or the upper bonding layer is a single-sided flocked fabric knitted by using the 20 D-120 D polyester, polypropylene or nylon monofilaments.

5. The detachable carpet according to claim 1, wherein, the upper bonding layer is a single-sided tufted fabric knitted by using 20 D-120 D polyester, polypropylene or nylon monofilaments, or the upper bonding layer is a single-sided flocked fabric knitted by using the 20 D-120 D polyester, polypropylene or nylon monofilaments.

6. The detachable carpet according to claim 1, wherein, a thickness of the bottom three-dimensional mesh fabric structure layer of the carpet surface is 2 mm-20 mm;

an area of a single mesh on the upper warp-knitted mesh fabric layer or the lower warp-knitted mesh fabric layer of the carpet surface ranges from 0.2 square millimeters to 100 square millimeters.

7. The detachable carpet according to claim 1, wherein, an area of a single mesh on a single-sided warp-knitted mesh fabric of the single-sided structure layer of the upper bonding layer ranges from 0.2 square millimeters to 100 square millimeters.

* * * * *